/

US008803061B2

(12) United States Patent
Stamm et al.

(10) Patent No.: US 8,803,061 B2
(45) Date of Patent: Aug. 12, 2014

(54) CIRCUITRY AND METHOD FOR COLLECTING IMAGE ARRAY DATA WITH SEPARATE ADDRESSING AND DYNAMIC CLAMPING OF PIXELS TO ALLOW FOR FASTER PIXEL DATA READOUT AND FULL REMOVAL OF PIXEL CHARGES

(75) Inventors: Michael Stamm, Wettingen (CH); Harold Mikula, Wettingen (CH); Daniel Morf, Buch am Irchel (CH); Heinrich Riem, Baden-Daettwil (CH); Victor Steinlin, Otelfingen (CH)

(73) Assignee: Varian Medical Systems International AG, Zug (CH)

( * ) Notice: Subject to any disclaimer, the term of this patent is extended or adjusted under 35 U.S.C. 154(b) by 200 days.

(21) Appl. No.: 13/549,678

(22) Filed: Jul. 16, 2012

(65) Prior Publication Data
US 2014/0014814 A1 Jan. 16, 2014

(51) Int. Cl.
*H01L 27/146* (2006.01)
*H04N 5/374* (2011.01)

(52) U.S. Cl.
USPC .................. 250/208.1; 348/308; 250/370.09

(58) Field of Classification Search
USPC .............. 250/370.08, 370.09, 370.11, 208.1; 348/308
See application file for complete search history.

(56) References Cited

U.S. PATENT DOCUMENTS

| | | | |
|---|---|---|---|
| 6,838,673 B2 * | 1/2005 | Morishita | ................ 250/370.09 |
| 6,856,351 B1 | 2/2005 | Weisfield | |
| 6,867,806 B1 * | 3/2005 | Lee et al. | ....................... 348/308 |
| 8,547,463 B2 * | 10/2013 | Mabuchi | ........................ 348/308 |
| 2001/0038075 A1 | 11/2001 | Morishita | |
| 2006/0186313 A1 | 8/2006 | Yokota | |
| 2006/0238632 A1 | 10/2006 | Shah | |

OTHER PUBLICATIONS

International Search Report and Written Opinion Dated Jan. 28, 2014 for PCT Application No. PCT/IB2013/002011.

* cited by examiner

*Primary Examiner* — Tony Ko
(74) *Attorney, Agent, or Firm* — Vedder Price, P.C.

(57) ABSTRACT

Circuitry and method for collecting image array data in which pixels are addressed and dynamically clamped separately. In accordance with one embodiment, pixels are addressed and clamped during different time intervals, thereby allowing faster pixel data readout while still allowing sufficient time to remove all pixel charges.

17 Claims, 5 Drawing Sheets

CIRCUITRY AND METHOD FOR COLLECTING IMAGE ARRAY DATA WITH SEPARATE ADDRESSING AND DYNAMIC CLAMPING OF PIXELS TO ALLOW FOR FASTER PIXEL DATA READOUT AND FULL REMOVAL OF PIXEL CHARGES

BACKGROUND

The present invention relates to radiation imaging systems, and in particular, to solid state X-ray radiation imaging systems.

The use of X-ray radiation has become a valuable and widespread tool in medical diagnoses and treatments. In film radiography, a burst of X-rays, after passing through the body, is recorded on high resolution X-ray film. In fluoroscopy, an image intensifier tube converts X-ray radiation to a video signal for viewing and recording interior body activity as a video image.

Film radiography is commonly used due to its good spatial resolution, high signal-to-noise ratio (SNR), large detection area and low cost. However, developing exposed X-ray film typically takes a minimum of ninety seconds which can be too long in emergency situations. Further, the relatively low dynamic range of X-ray film can result in under- or over-exposed images and, therefore, necessitate additional exposures which increase the aforementioned time delay as well as the X-ray dosage received by the patient.

The image intensifier tube used in fluoroscopy has a greater exposure latitude than X-ray film, but also has a more limited active detection area and lower spatial resolution. The lower spatial resolution associated with the total active area is somewhat mitigated in that the image intensifier tubes allow magnification of the central image portion, thereby providing a means to enhance visual details. However, the image intensifier tube is typically heavy, bulky and expensive, and can introduce image distortion which can only be partially removed during post processing.

A number of alternative X-ray imaging technologies have been developed. For example, one alternative, known as computed radiography, involves the use of a photostimulable phosphor plate which has the same physical appearance as a standard X-ray film cassette and provides good spatial resolution, SNR and dynamic range. However, after exposure to X-rays, the photostimulable phosphor plate must be scanned with a laser system which is large and expensive, and the readout process is just as slow as the development of film.

Another alternative which provides good spatial resolution and dynamic range, as well as the added advantage of compatibility with real time digital image processing techniques, involves the use of solid state detector panels. One such panel uses an amorphous silicon (a-Si) detector array arranged as a two dimensional matrix of pixels, each of which consists of a photosensitive element and a transistor switch. As with X-ray film cassettes, the detector array is covered with a scintillation layer to convert impinging X-rays into visible light for the photosensitive elements.

As demands have increased, however, for faster access to the image data, it has become increasingly difficult to balance data readout rates with the need for adequately discharging the pixels, i.e., removing photodiode charges within the pixels, between images.

SUMMARY

In accordance with the presently claimed invention, circuitry and method are provided for collecting image array data in which pixels are addressed and dynamically clamped separately. In accordance with one embodiment, pixels are addressed and clamped during different time intervals, thereby allowing faster pixel data readout while still allowing sufficient time to remove all residual pixel charges.

In accordance with one embodiment of the presently claimed invention, an image array includes:
  a plurality of bias lines to convey a common bias voltage;
  a plurality of data lines to convey a plurality of data signals;
  a plurality of address lines to convey a plurality of address signals;
  a plurality of reference lines to convey a common reference voltage;
  a plurality of clamp lines to convey a plurality of clamp control signals; and
  a plurality of pixels disposed along a plurality of rows and a plurality of columns, wherein each pixel includes
    a photodiode coupled to one of the plurality of bias lines,
    a switch transistor including first and second switch electrodes coupled to the photodiode and one of the plurality of data lines, respectively, and a switch control electrode coupled to one of the plurality of address lines, and
    a clamp transistor including first and second clamp electrodes coupled to the photodiode and one of the plurality of reference lines, respectively, and a clamp control electrode coupled to one of the plurality of clamp lines.

In accordance with another embodiment of the presently claimed invention, a pixel for an image array includes:
  a bias line to convey a bias voltage;
  a data line to convey a data signal;
  an address line to convey an address signal;
  a reference line to convey a reference voltage;
  a clamp line to convey a clamp control signal;
  a photodiode coupled to the bias line;
  a switch transistor including first and second switch electrodes coupled to the photodiode and the data line, respectively, and a switch control electrode coupled to the address line; and
  a clamp transistor including first and second clamp electrodes coupled to the photodiode and the reference line, respectively, and a clamp control electrode coupled to the clamp line.

In accordance with still another embodiment of the presently claimed invention, a method for collecting image data includes:
  providing power to an image array comprising
    a plurality of bias lines to convey a common bias voltage,
    a plurality of data lines to convey a plurality of data signals,
    a plurality of address lines to convey a plurality of address signals,
    a plurality of reference lines to convey a common reference voltage,
    a plurality of clamp lines to convey a plurality of clamp control signals, and
    a plurality of pixels disposed along a plurality of rows and a plurality of columns, wherein each pixel includes
      a photodiode coupled to one of the plurality of bias lines,
      a switch transistor including first and second switch electrodes coupled to the photodiode and one of the plurality of data lines, respectively, and a switch control electrode coupled to one of the plurality of address lines, and a clamp transistor including first and second clamp electrodes coupled to the photodiode and one of the plurality of reference lines, respectively, and a clamp control electrode coupled to one of the plurality of clamp lines;

applying the plurality of address signals to the image array; and applying the plurality of clamp control signals to the image array.

DETAILED DESCRIPTION

Figure 1:
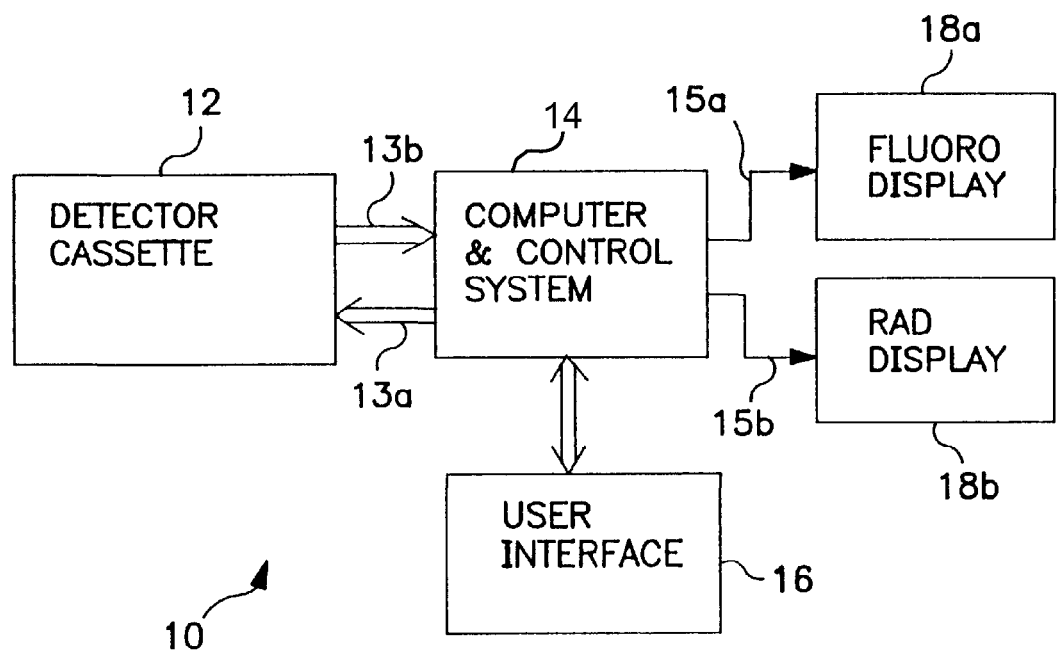
FIG. 1 is a functional block diagram of an X-ray imaging system in accordance with the present invention.

Referring to FIG. 1, an X-ray imaging system 10 in accordance with the present invention includes a detector cassette 12, a computer and control system 14, a user interface 16, a fluoroscopic display 18a and a radiographic display 18b, interconnected substantially as shown. A user controls the system 10 by way of a user interface 16 (e.g., graphical user interface display, keyboard, mouse, etc.) which communicates with the computer and control system 14. Accordingly, the computer and control system 14 generates control signals 13a for the detector cassette 12 which provides image data signals 13b in return. (As desired, one display monitor could be used to selectively display both fluoroscopic and radiographic images, as well as the graphical user interface display image, e.g., all images could be displayed simultaneously in a "windowed" format, or either a fluoroscopic image or a radiographic image could be displayed along with a pull down menu bar, which menu bar constitutes the graphical user interface providing for selection of fluoroscopic or radiographic imaging.)

Following processing of such image data, the computer and control system 14 provides fluoroscopic image data 15a or radiographic image data 15b for display on a fluoroscopic display 18a or a radiographic display 18b, respectively, depending upon the selected mode of operation.

Figure 2:
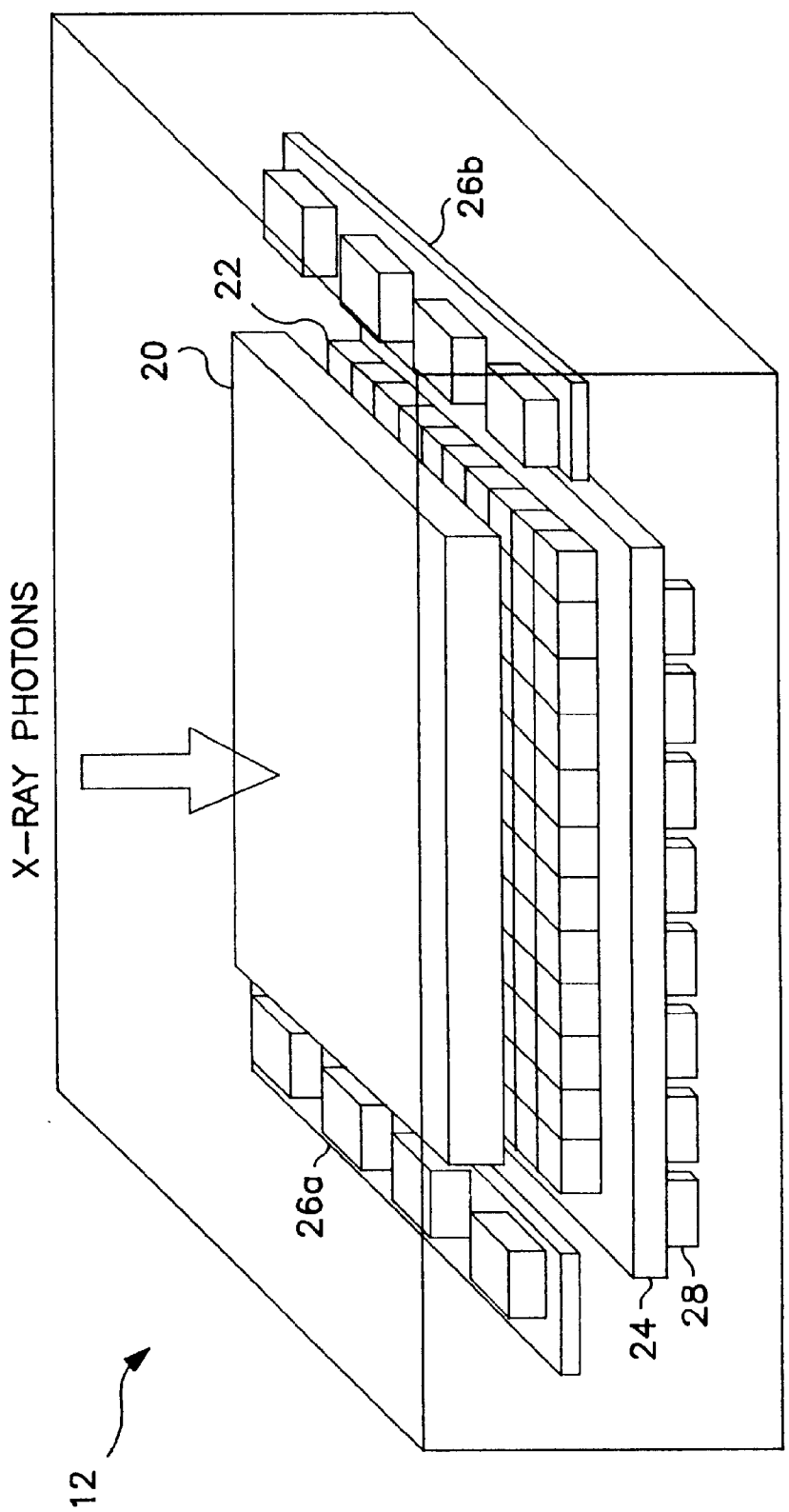
FIG. 2 is an exploded perspective view of an X-ray detector cassette for an X-ray imaging system in accordance with the present invention.

Referring to FIG. 2, the detector cassette 12 is similar in external appearance to the typical cassette which contains standard medical X-ray film and is, therefore, highly mobile and easy to use as required for a radiographic mode of operation. A scintillation layer 20, e.g., of cesium iodide (CsI), absorbs and converts impinging X-ray photons to visible light photons for detection by photosensitive elements within the detector array 22, e.g., of amorphous silicon (a-Si). The thickness of the scintillation layer 20 is selected so as to absorb sufficient X-ray photons and produce sufficient visible photons so as to generate an adequate SNR for fluoroscopic operation. Similarly, the columns, or "needles," of the crystalline CsI are selected so as to have diameters sufficiently small to support the spatial resolution sampling desired for radiographic operation.

The detector array 22 is designed in accordance with well known techniques into a two dimensional array of microscopic squares referred to as picture elements, or "pixels." Each pixel is composed of an addressable photosensitive element, such as a photodiode and switching transistor combination. As discussed in more detail below, each pixel is accessed in accordance with drive signals from off-array driver circuit assemblies 26a, 26b which provide addressing control signals. In accordance with well known techniques, the lateral dimensions of the photodiodes are made sufficiently small to provide the desired spatial resolution imaging for radiographic operation and the capacitance of the photodiodes is designed to be sufficiently large to provide the desired signal handling capacity for accommodating the largest signal produced during radiographic operation.

The pixel data accessed by the driver circuits 26 are read out by a receiver, or readout, circuit assembly 28, as discussed in more detail below. The receiver circuit assembly 28 and detector array 22 are mounted on opposing sides of a base plate 24. (The receiver circuit assembly 28 is placed beneath the array 22 so as to minimize the lateral size of the detector cassette 12 and thereby make the detector cassette 12 approximately the same size as a film cassette. If so desired, the driver circuits 26 can also be placed beneath the array 22. If so desired, the readout driver circuits 26 can also be placed lateral to the array 22.)

Figure 3:
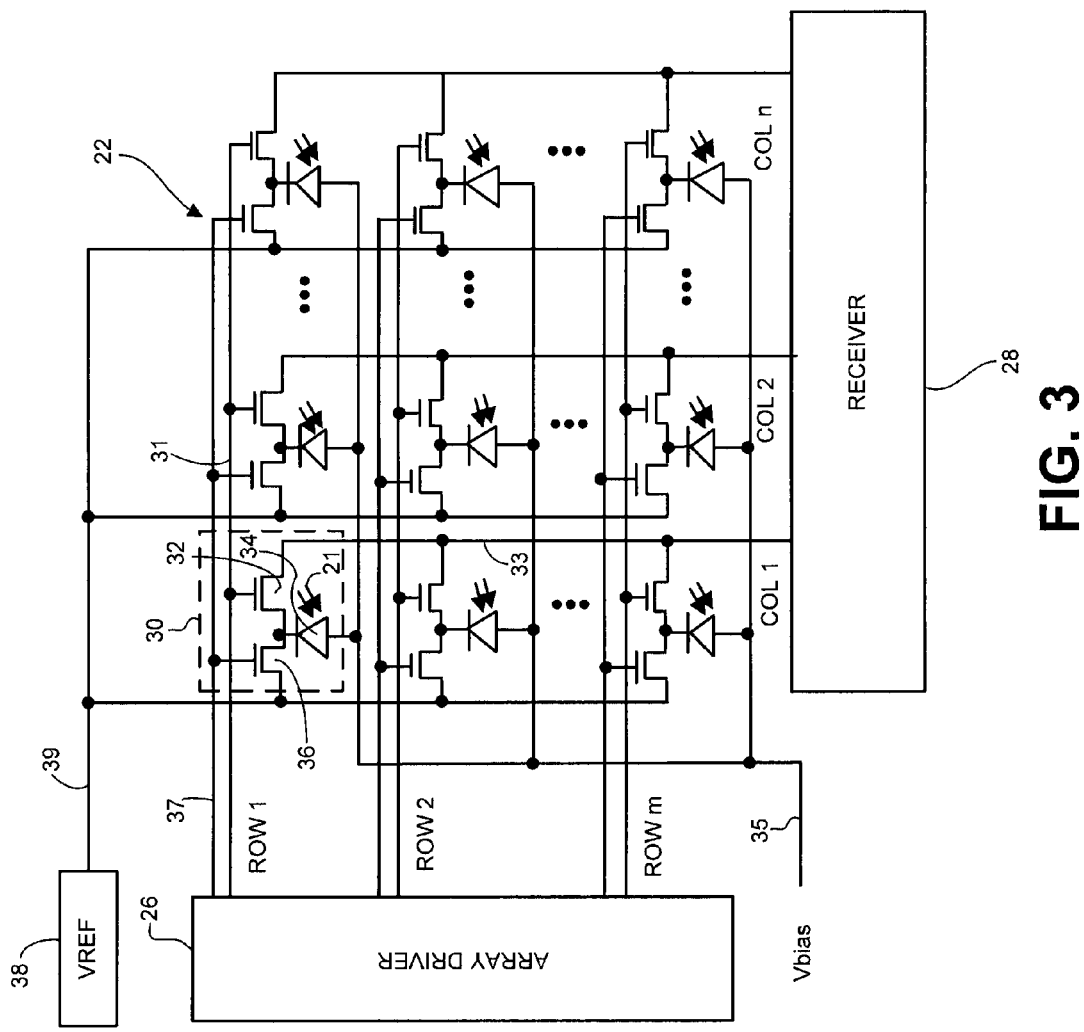
FIG. 3 is a schematic diagram of a portion of the detector array of FIG. 2.

Referring to FIG. 3, the detector array 22, as noted above, is composed of a two dimensional array, or matrix, of photosensitive pixels 30 which, in one embodiment, include a switching transistor 32, a photodiode 34 and a clamping transistor 36. The anode of the photodiode 34 is biased by a biasing voltage 35 to establish a capacitance for storing electrical charges which accumulate due to the reception of incident light 21 from the scintillation layer 20 (FIG. 2). When the pixel 30 is accessed, a row address signal 31 from the array driver circuit 26 drives the gate of the switching transistor 32 (TFT), thereby providing a column data signal 33 representing the stored charge from the photodiode 34. This signal 33 is received and buffered by a charge sensitive amplifier within the receiver circuit assembly 28 in accordance with well known techniques.

Each row address signal 31 is asserted for a predetermined period of time, referred to as "line time." During assertion of each row address signal 31, the signal 33 from each pixel along that row is transmitted via the column data lines to the receiver circuit assembly 28 where the signal 33 on each data line is received and buffered by a corresponding charge sensitive amplifier. Hence, an entire row of image data is captured in one line time period. With each subsequent line time period, a subsequent row of image data is captured. Meanwhile, previously addressed rows of pixels are discharged by assertions of their respective clamping signals 37 (discussed in more detail below) turning on their clamping transistors 36, thereby coupling the cathodes of their photodiodes 34 to a reference voltage 39 provided by a reference voltage source 38. At the end of a "frame time" period, the entire image has been captured. In this manner, each pixel contained in the entire active detection area is sampled individually.

The rows of clamping transistors 36, driven by respective clamping control signals 37, provide for dynamic clamping of each row of pixels 30 while other rows of pixels 30 can be separately addressed for data readout. In other words, various rows of pixels 30 can be independently and arbitrarily clamped, including multiple rows simultaneously (discussed in more detail below), while reading out charge from the photodiodes 34 within one or more other rows of pixels 30.

The clamping transistor 36 within each pixel 30 provides for clamping of the photodiode 34 to a reference voltage 39. Such clamping of the photodiode 34 decouples the degree of reset of the photodiode 34. Therefore, the accuracy of photodiode charge readout is less dependent upon readout times of long duration relative to the RC time constant formed by the photodiode 34 and switching transistor 32. The photodiode charge can be read out for a shorter time interval than normal and then clamped to the reference voltage 39 while charges from one or more other rows of pixels 30 are being read out. The level of accuracy then becomes dependent upon the precision of the duration of charge readout, and independent of the length of the duration of the charge readout. Making charge readout accuracy dependent primarily upon readout duration precision, as opposed to the length of the readout duration, makes high charge readout accuracy possible with short readout time in comparison to the RC time constant of the photodiode 30 and switching transistor 34, thereby enabling imaging frame rates higher than previously possible.

Such otherwise incomplete pixel charge readout and successive resetting of rows of photodiodes also enables adaptive readout of photodiode charges, e.g., selectively variable readout durations according to the intensity of light impinging upon the photodiodes. The duration of charge readout can be set to allow just enough charge to be read out so as to maximize the input range of the readout electronics in the receiver 28. As a result, efficient use of the readout electronics 28 can be maximized, as can the dynamic range of the imaging system as a whole.

Typically, rows of pixels 30 are connected to the readout electronics 28 in an order such that the first row to be read out is the row furthest away from the readout electronics 28, with the next row to be read out adjacent to the first row and, therefore, closer to the readout electronics 28, and so on. Reading of the rows is sequential, reading out each row one by one. Alternatively, multiple rows can be read out at one time. Such a readout process is referred to as "binning", which increases the readout speed but decreases the spatial resolution of the array.

Figure 4:
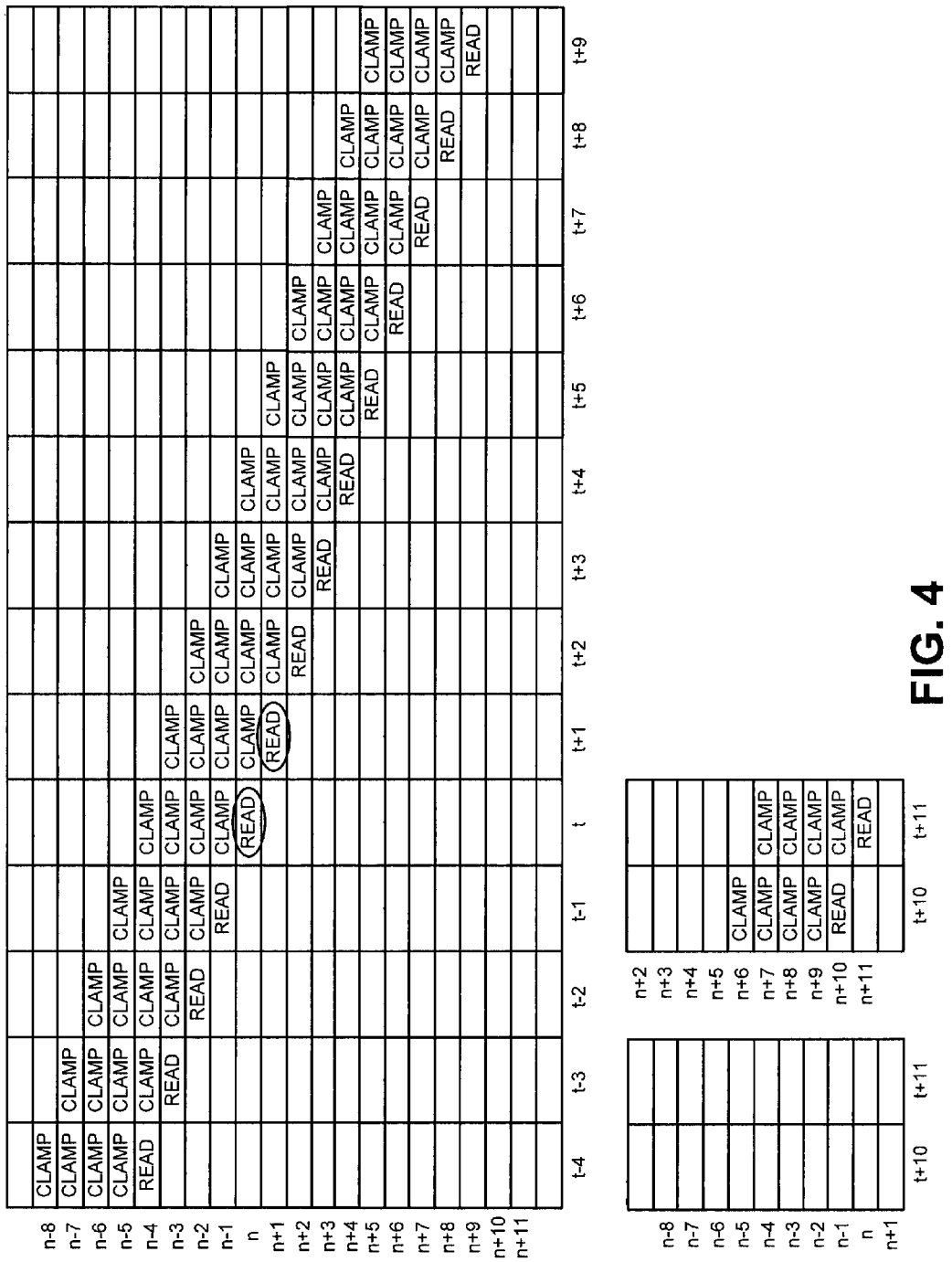
FIG. 4 depicts addressing and dynamically clamping rows of pixels separately in accordance with one embodiment of the presently claimed invention.

Referring to FIG. 4, charge readout and pixel discharge in accordance with one embodiment of the presently claimed invention proceeds as follows. For example, picking up at row n within the array, the pixels 30 in row n have their charge read during time interval t (as discussed above). Meanwhile, multiple preceding rows (e.g., four for purposes of this example) n−1, n−2, n−3, n−4 of pixels 30 are clamped (as discussed above). During the next time interval t+1, the next row, n+1 of pixels 30 is read out, while the preceding four rows n, n−1, n−2, n−3 of rows are clamped. This reading and clamping of rows of pixels continues as shown.

As can be seen, this results in each row of pixels being read out during each time interval, t, t+1, t+2, . . . , while each preceding row of pixels is clamped for multiple such time intervals (four in this example). This allows each row of pixels to be connected to the readout electronics 28 for a time interval that is shorter than the full time otherwise necessary to completely discharge the pixels 30. However, such a short readout interval provides for faster image data readout. And, since the pixels 30 do not completely discharge during such short readout interval, they are discharged by being clamped for multiple such time intervals following data readout. (In accordance with one embodiment, the time intervals t, t+1, t+2, . . . are equal, but can be made unequal depending upon the particular design constraints of the image array or other considerations.)

This particular example in which four preceding rows of pixels are clamped for four time intervals following the data readout from each row is based on the readout time interval being one-fifth of the time interval necessary to ensure adequate (e.g., full) pixel discharge. For example, if a conventional image array required a readout time interval of 10 microseconds for each row, so as to ensure adequate pixel discharge, then pixel readout and discharge in accordance with the presently claimed invention would have a pixel row readout time of two microseconds followed by a clamping time of eight microseconds, which is four successive occurrences of the two microsecond pixel row readout time interval. For a more general case, if the readout time interval has a duration of TR and the time necessary for discharging a pixel has a duration of TX, then the required clamping time would have an interval of TX−TR. Preferably, this clamping time interval TX−TR would be equal to, or perhaps slightly less than an integer multiple M of the readout time TR (e.g., TX−TR=M*TR), with such integer value M equaling the number of preceding rows of pixels requiring discharge during such clamping time TX−TR.

Figure 5:
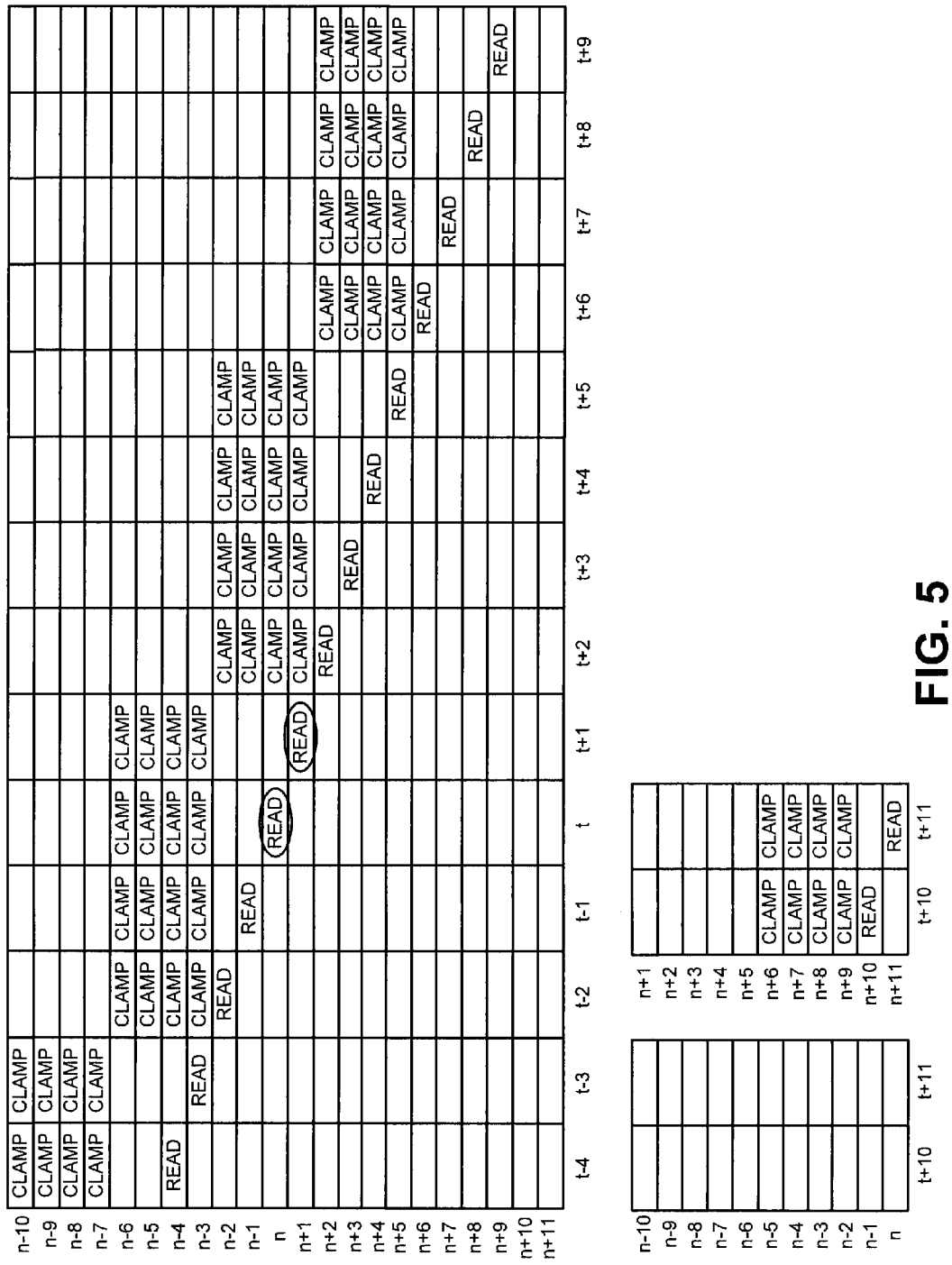
FIG. 5 depicts addressing and dynamically clamping rows of pixels separately in accordance with another embodiment of the presently claimed invention.

Referring to FIG. 5, in accordance with another embodiment of the presently claimed invention, preceding rows of pixels can be clamped as static blocks, or groups, of rows, rather than in successively incremented groups of row as depicted in FIG. 4.

Based on the foregoing discussion, it can be seen that, in accordance with the presently claimed invention, arbitrary rows of photodiodes in an imaging array can be clamped while charge from other arbitrary rows of photodiodes within the same image array can be read out. Further, it can be seen that photodiode charge readout accuracy can be made dependent upon the precision of the readout timing, as opposed to the length of the duration of such readout time. This enables high frame rates to be achieved while maintaining high pixel charge readout accuracy.

Various other modifications and alterations in the structure and method of operation of this invention will be apparent to those skilled in the art without departing from the scope and spirit of the invention. Although the invention has been described in connection with specific embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including an image array, comprising:
a plurality of bias lines to convey a common bias voltage;
a plurality of data lines to convey a plurality of data signals;
a plurality of address lines to convey a plurality of address signals;
a plurality of reference lines to convey a common reference voltage;
a plurality of clamp lines to convey a plurality of clamp control signals; and
a plurality of pixels disposed along a plurality of rows and a plurality of columns, wherein each pixel includes
a photodiode coupled to one of said plurality of bias lines,
a switch transistor including first and second switch electrodes coupled to said photodiode and one of said plurality of data lines, respectively, and a switch control electrode coupled to one of said plurality of address lines, and
a clamp transistor including first and second clamp electrodes coupled to said photodiode and one of said plurality of reference lines, respectively, and a clamp control electrode coupled to one of said plurality of clamp lines.

2. The apparatus of claim 1, wherein each one of said plurality of address signals is asserted substantially contemporaneously with multiple ones of said plurality of clamp control signals.

3. The apparatus of claim 1, wherein each one of said plurality of address signals for one of said rows of pixels is asserted substantially contemporaneously with multiple ones of said plurality of clamp control signals for other ones of said rows of pixels.

4. The apparatus of claim 1, wherein each one of said plurality of address signals is asserted for an address time interval T, and each one of multiple ones N of said plurality of clamp control signals is asserted for a clamp time interval N*T substantially equal to a multiple N of said address time interval T.

5. The apparatus of claim 1, wherein each one of said plurality of address signals for one of said rows of pixels is asserted for an address time interval T, and each one of multiple ones N of said plurality of clamp control signals for other ones of said rows of pixels is asserted for a clamp time interval N*T substantially equal to a multiple N of said address time interval T.

6. The apparatus of claim 1, further comprising driver circuitry coupled to said plurality of clamp lines to provide said plurality of clamp control signals.

7. The apparatus of claim 1, further comprising driver circuitry coupled to:
said plurality of address lines to provide said plurality of address signals; and
said plurality of clamp lines to provide said plurality of clamp control signals.

8. An apparatus including a pixel for an image array, comprising:
a bias line to convey a bias voltage;
a data line to convey a data signal;
an address line to convey an address signal;
a reference line to convey a reference voltage;
a clamp line to convey a clamp control signal;
a photodiode coupled to said bias line;
a switch transistor including first and second switch electrodes coupled to said photodiode and said data line, respectively, and a switch control electrode coupled to said address line; and
a clamp transistor including first and second clamp electrodes coupled to said photodiode and said reference line, respectively, and a clamp control electrode coupled to said clamp line.

9. The apparatus of claim 8, wherein said address signal and said clamp control signal are asserted during substantially mutually exclusive time intervals.

10. The apparatus of claim 8, wherein said address signal is asserted for an address time interval T, and said clamp control signal is asserted for a clamp time interval N*T substantially equal to a multiple N of said address time interval T.

11. The apparatus of claim 8, further comprising driver circuitry coupled to said clamp line to provide said clamp control signal.

12. The apparatus of claim 8, further comprising driver circuitry coupled to:
said address line to provide said address signal; and
said clamp line to provide said clamp control signal.

13. A method for collecting image data, comprising:
providing power to an image array comprising
a plurality of bias lines to convey a common bias voltage,
a plurality of data lines to convey a plurality of data signals,
a plurality of address lines to convey a plurality of address signals,
a plurality of reference lines to convey a common reference voltage,
a plurality of clamp lines to convey a plurality of clamp control signals, and
a plurality of pixels disposed along a plurality of rows and a plurality of columns, wherein each pixel includes
a photodiode coupled to one of said plurality of bias lines,
a switch transistor including first and second switch electrodes coupled to said photodiode and one of said plurality of data lines, respectively, and a switch control electrode coupled to one of said plurality of address lines, and
a clamp transistor including first and second clamp electrodes coupled to said photodiode and one of said plurality of reference lines, respectively, and a clamp control electrode coupled to one of said plurality of clamp lines;
applying said plurality of address signals to said image array; and
applying said plurality of clamp control signals to said image array.

14. The apparatus of claim 13, wherein each one of said plurality of address signals is asserted substantially contemporaneously with multiple ones of said plurality of clamp control signals.

15. The apparatus of claim 13, wherein each one of said plurality of address signals for one of said rows of pixels is asserted substantially contemporaneously with multiple ones of said plurality of clamp control signals for other ones of said rows of pixels.

16. The apparatus of claim 13, wherein each one of said plurality of address signals is asserted for an address time interval T, and each one of multiple ones N of said plurality of clamp control signals is asserted for a clamp time interval N*T substantially equal to a multiple N of said address time interval T.

17. The apparatus of claim 13, wherein each one of said plurality of address signals for one of said rows of pixels is asserted for an address time interval T, and each one of multiple ones N of said plurality of clamp control signals for other ones of said rows of pixels is asserted for a clamp time interval N*T substantially equal to a multiple N of said address time interval T.

* * * * *